(12) United States Patent
Seo et al.

(10) Patent No.: US 9,883,542 B2
(45) Date of Patent: Jan. 30, 2018

(54) METHOD AND DEVICE FOR PERFORMING LINK ADAPTATION IN WIRELESS COMMUNICATION SYSTEM

(71) Applicant: LG ELECTRONICS INC., Seoul (KR)

(72) Inventors: Inkwon Seo, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 14/909,032

(22) PCT Filed: Jul. 29, 2014

(86) PCT No.: PCT/KR2014/006919
§ 371 (c)(1),
(2) Date: Jan. 29, 2016

(87) PCT Pub. No.: WO2015/016567
PCT Pub. Date: Feb. 5, 2015

(65) Prior Publication Data
US 2016/0198504 A1 Jul. 7, 2016

Related U.S. Application Data

(60) Provisional application No. 61/860,235, filed on Jul. 30, 2013.

(51) Int. Cl.
*H04W 76/02* (2009.01)
*H04L 1/00* (2006.01)
(Continued)

(52) U.S. Cl.
CPC ......... *H04W 76/023* (2013.01); *H04L 1/0001* (2013.01); *H04W 72/044* (2013.01); *H04W 72/0473* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2014/0004867 A1* | 1/2014 | Noh ................... | H04W 76/023 455/450 |
| 2014/0051449 A1* | 2/2014 | Yerrabommanahalli | H04W 36/30 455/437 |
| 2015/0127733 A1* | 5/2015 | Ding ...................... | H04W 4/08 709/204 |

FOREIGN PATENT DOCUMENTS

| KR | 10-2012-0074255 | 7/2012 |
|---|---|---|
| KR | 10-2013-0035903 | 4/2013 |

(Continued)

OTHER PUBLICATIONS

PCT International Application No. PCT/KR20141006919, Written Opinion of the International Searching Authority dated Nov. 13, 2014, 15 pages.

*Primary Examiner* — Diane Lo
(74) *Attorney, Agent, or Firm* — Lee, Hong, Degerman, Kang & Waimey

(57) ABSTRACT

One embodiment of the present invention relates to a method by which a device-to-device (D2D) terminal performs link adaptation in a wireless communication system, the D2D link adaptation method comprising the steps of: performing measurement on a resource region to be used for D2D communication; and determining whether the measurement performance result satisfies a trigger condition, wherein if the trigger condition is satisfied for a first time with respect to the resource region, first link adaptation is performed, and if the trigger condition is satisfied for n times (n>=2) with respect to the resource region, second link adaptation is performed.

20 Claims, 6 Drawing Sheets

(51) Int. Cl.
*H04W 72/04* (2009.01)
*H04W 92/18* (2009.01)

(56) References Cited

FOREIGN PATENT DOCUMENTS

| | | |
|---|---|---|
| KR | 10-2013-0070661 | 6/2013 |
| WO | 2012/129806 | 10/2012 |
| WO | 2013/032259 | 3/2013 |

* cited by examiner (a) Network-assisted D2D (b) Network-assisted D2D
(Partial network)

(c) Master UE-assisted D2D
(out of coverage)

METHOD AND DEVICE FOR PERFORMING LINK ADAPTATION IN WIRELESS COMMUNICATION SYSTEM

CROSS-REFERENCE TO RELATED APPLICATIONS

This application is the National Stage filing under 35 U.S.C. 371 of International Application No. PCT/KR2014/006919, filed on Jul. 29, 2014, which claims the benefit of U.S. Provisional Application No. 61/860,235, filed on Jul. 30, 2013, the contents of which are all hereby incorporated by reference herein in their entirety.

TECHNICAL FIELD

Following description relates to a wireless communication system, and more particularly, to a method of performing measurement and link adaptation and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE OF THE INVENTION

Technical Task

A technical task of the present invention is to provide a method of performing measurement and link adaptation in D2D.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of performing link adaptation, which is performed by a D2D (device to device) UE in a wireless communication system, including: performing measurement on a resource region used for D2D communication and determining whether a result of performing the measurement satisfies a trigger condition. In this case, if the trigger condition is satisfied for a first time, first link adaptation is performed on the resource region and if the trigger condition is satisfied for n times (n>=2), second link adaptation is performed on the resource region.

To further achieve these and other advantages and in accordance with the purpose of the present invention, according to a second technical aspect, a D2D (device to device) UE in a wireless communication system including: a receive module and a processor configured to perform measurement on a resource region used for D2D communication and determine whether a result of performing the measurement satisfies a trigger condition. In this case, if the trigger condition is satisfied for a first time, first link adaptation is performed on the resource region and if the trigger condition is satisfied for n times (n>=2), second link adaptation is performed on the resource region.

The first and the second technical aspect of the present invention can include all or a part of items described in the following.

The first link adaptation can include reporting a preferred resource region calculated from the measurement result.

The preferred resource region may correspond to a resource set of which interference is smallest among a plurality of resource sets constructing a total resource region.

The first link adaptation can include at least one of power control, MCS (modulation and coding scheme) adjustment and resource adjustment.

The second link adaptation can include transmitting a resource reallocation request and receiving one of a resource reallocation response and a DLF (D2D link failure) command in response to the resource reallocation request.

The resource reallocation response can include at least one of information for indicating a resource region different from the resource region and additional transmit power assignment.

The DLF command can be transmitted in case that resource reallocation or additional transmit power assignment is not available.

If a number of performing the second link adaptation exceeds a predetermined number, the D2D UE can declare DLF.

The D2D UE can perform the D2D communication until a confirm message for the DFL is received after the DLF is declared.

If a signal is successfully transmitted and received more than a predetermined count during a time period until the confirm message for the DFL is received after the DLF is declared, the DLF declaration can be nullified.

The trigger condition may correspond to one of a SINR smaller than a predetermined value, receiving a NACK more than a predetermined count, not receiving a D2D signal for more than predetermine time and receiving a NACK in response to transmission using a minimum coding rate.

Advantageous Effects

According to the present invention, a D2D device is able to efficiently perform D2D communication via link adaptation.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
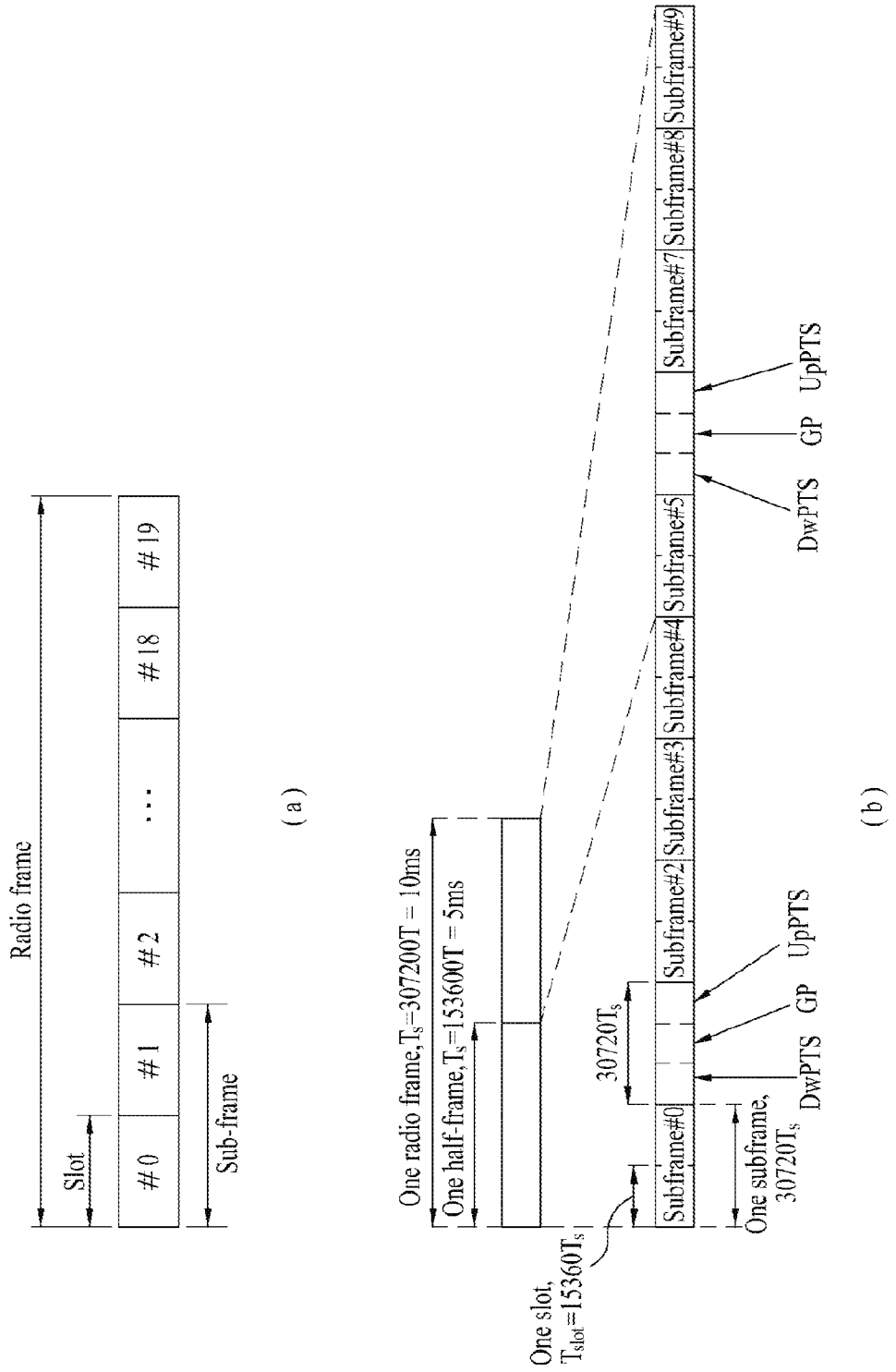
FIG. 1 is a diagram for a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
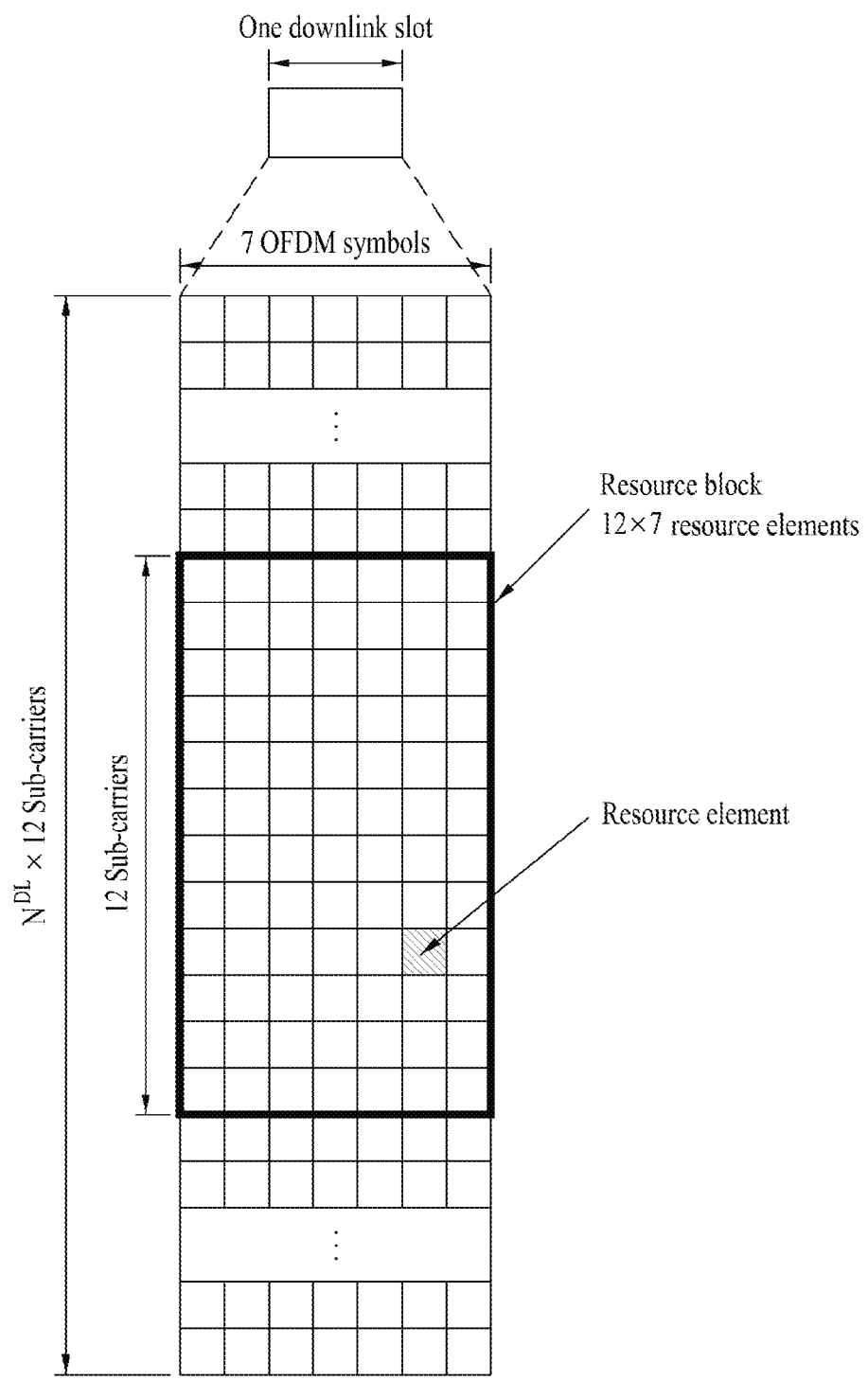
FIG. 2 is a diagram for a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
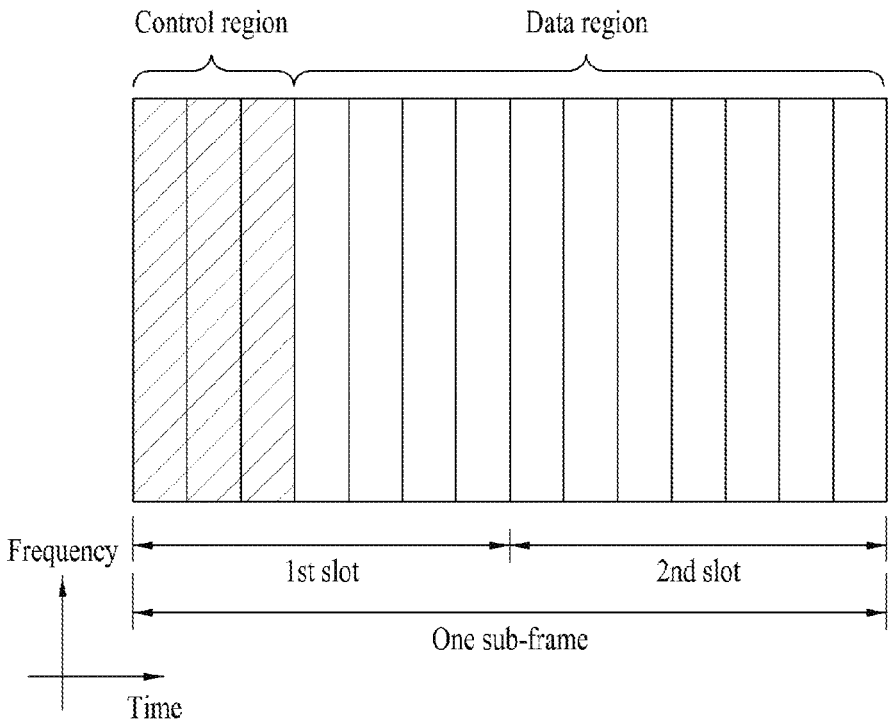
FIG. 3 is a diagram for a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
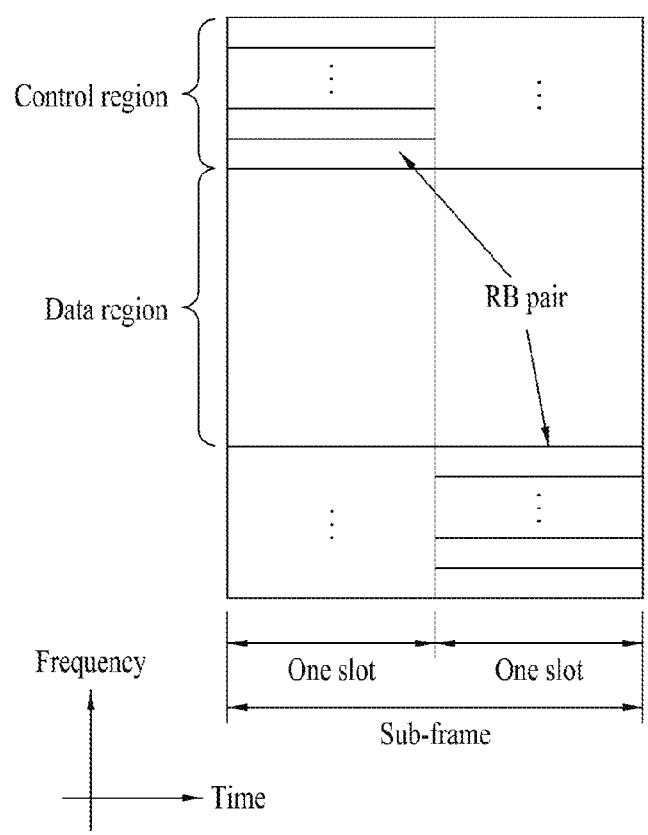
FIG. 4 is a diagram for a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Measurement/Measurement Report

Measurement report is performed for a plurality of methods for securing mobility of a UE or one of a plurality of the methods. Since coherent demodulation of a prescribed level is required for the measurement report, the measurement report can be performed after a UE obtains synchronization and physical layer parameters except reception signal strength measurement. The measurement report corresponds to a concept including RLM measurement capable of evaluating whether or not a radio link is failed in a manner of measuring such an RRM as RSRP (reference signal receive power) for measuring a signal strength of a serving cell or a neighbor cell or a ratio of total reception power to a signal strength and the like, RSSI (received signal strength indicator) and RSRQ (reference signal received quality) and measuring link quality with a serving cell.

In relation to the RRM, the RSRP corresponds to a linear average of power distribution of an RE in which a CRS is transmitted in DL. The RSSI corresponds to a linear average of total reception power received by a corresponding UE. The RSSI is measured for an OFDM symbol including an RS for an antenna port $0$. The RSSI corresponds to a measurement value including interference and noise power received from neighboring cells. If upper layer signaling indicates a specific subframe to measure RSRQ, the RSSI is measured for all OFDM symbols included in the indicated subframe. The RSRQ corresponds to a value measured by such a form as N*RSRP/RSSI. In this case, N corresponds to the number of RBs of a corresponding bandwidth at the time of measuring the RSSI.

An object of performing the RLM is to determine whether a UE is 'in-sync' or 'out-of-synch' for a serving cell of the UE in a manner of making the UE monitor downlink quality of the serving cell. In this case, the RLM is performed based on a CRS. The downlink quality estimated by the UE is compared with 'in-synch threshold (Qin)' and 'out-of-synch threshold (Qout). The threshold can be represented as PDCCH BLER (block error rate) of the serving cell. In particular, the Qout and the Qin correspond to 10% BLER and 2% BLER, respectively. Practically, the Qin and the Qout correspond to values corresponding to SINR (signal-to-noise-plus-interference ratio) of a received CRS. If the CRS reception SINR is equal to or greater than a prescribed level (Qin), it is determined as a UE is attached to a corresponding cell. If the reception SINR is equal to or less than a prescribed level (Qout), RLF (radio link failure) is declared.

As mentioned earlier in the definition of the RSRP, measurement report is performed upon the basic premise of using a CRS. Yet, when cells share an identical PCID with each other, it is difficult to distinguish the cells from each other based on a CRS. Hence, it is unable to perform RRM for each cell using measurement report including RSRP/RSRQ based on a CRS only. Hence, when cells commonly include an identical PCID, it is able to make additional RSRP/RSRQ measurement report to be performed based on an individually transmitted CSI-RS. When a CSI-RS of a specific cell is received, neighboring cells may not transmit a signal to an RE in which the CSI-RS is transmitted to increase reception accuracy. By doing so, it is able to perform more accurate measurement although transmission frequency of a CSI-RS is lower than transmission frequency of a CRS. Hence, in case that cells include PCIDs different from each other, if the cells perform CRS-based RSRP/RSRQ measurement report and CSI-RS RSRP/RSRQ measurement report together, RRM accuracy of a network can be enhanced.

A different main object of transmitting a CSI-RS transmitted from each cell is to make a CSI feedback, which is performed by a UE to help scheduling of a base station determining a rank to be used for transmitting downlink data between a cell and the UE, a precoding matrix, MCS (modulation and coding scheme or CQI) and the like. In CoMP transmission scheme, a UE should make a feedback on CSI not only downlink with a serving cell but also downlink with a cooperative cell. If a UE makes a feedback on CSI for all cells in a CoMP cluster to which a serving cell belongs, it may have huge overhead. Hence, it is able to configure CSI to be fed back for a part of cells in a CoMP cluster having a value for coordinated scheduling and cooperative data transmission, i.e., CoMP measurement set. A CoMP measurement set for a specific UE can be determined in a manner of selecting cells of which RSRP is equal to or greater than a prescribed level. To this end, a UE performs RSRP measurement report for cells within a CoMP cluster to which the UE belongs thereto. Or, a base station designates configurations of CSI-RSs on which RSRP or RSRQ is to be measured by a UE as a CoMP management set and informs the UE of the CoMP management set. The UE measures RSRP or RSRQ for CSI-RSs transmitted from cells belonging to the designated CoMP management set. If a result of the measurement satisfies a specific condition, the UE can perform a report.

Moreover, it is necessary to enable ICIC between CoMP clusters. To this end, in order for a network and a UE to determine a cell causing strong interference to the UE among cells of a neighboring CoMP cluster and a cell receiving strong uplink interference from the UE, the UE performs RSRP measurement and reporting for the cells belonging to the neighboring CoMP cluster.

If CRS-based RSRP/RSRQ measurement reporting, which is performed for mobility management of a UE such as handover and the like, and CSI-RS-based RSRQ/RSRQ measurement reporting, which is performed CoMP measurement set configuration and ICIC, are performed together, RRM accuracy of a network and flexibility can be enhanced.

Figure 5:
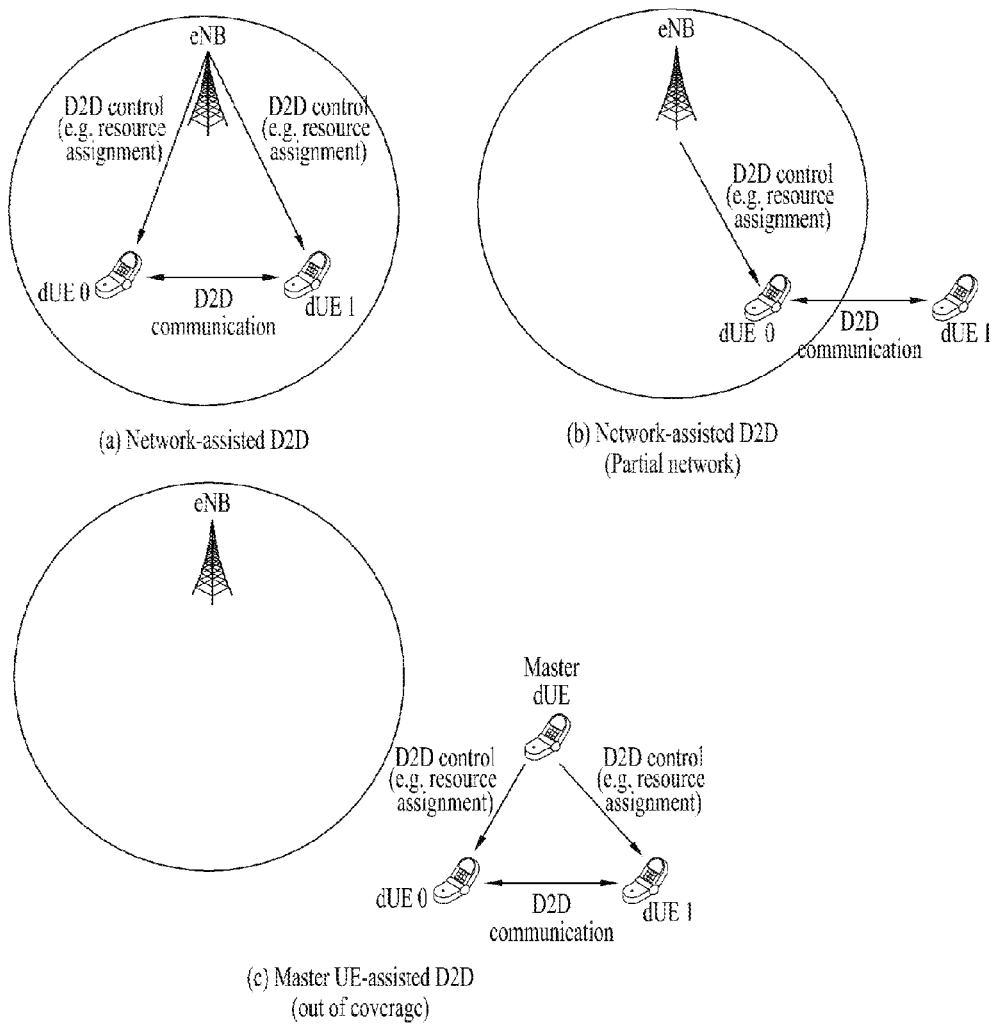
FIG. 5 is a diagram for a D2D system to which an embodiment of the present invention is applicable.

In the following, measurement in D2D communication, link adaptation and the like according to embodiments of the present invention are explained based on the aforementioned explanation. The embodiments of the present invention can be applied to one or more D2D scenarios shown in FIG. 5. FIG. 5 (*a*) shows a network-supporting D2D scenario. According to the network-supporting D2D scenario, all UEs belonging to a D2D pair may exist within network coverage and a resource used for a D2D operation (hereinafter, a D2D resource/resource region. The D2D resource can also be used as a meaning including transmit power of a D2D signal) can be allocated by a serving base station. FIG. 5 (*b*) shows a case that a part of UEs belonging to a D2D pair exist within network coverage only and the rest of the UEs belongs to out of the coverage. In FIG. 5 (*b*), a D2D resource can also be allocated by a serving base station. FIG. 5 (*c*) shows a case that all UEs belonging to a D2D pair belong to out of the network coverage. When all UEs are positioned at the outside of the network, a master UE may or may not exist. If the master UE exists, the master UE can perform D2D resource allocation and the like (FIG. 5 (*c*)). If the master UE does not exist, resource allocation can be performed by a D2D TX UE (hereinafter, dTUE). Or, resource allocation can be performed by a D2D RX UE (hereinafter, dRUE) (the dTUE or the dRUE may operate as a master dUE).

In various scenarios shown in FIG. 5, a base station or a master UE can control a resource for a D2D pair, transmit power and the like in consideration of a cellular UE (Wide Area Network UE) or a different D2D pair. And, the dTUE can perform MCS adjustment, power control within a range restricted by a base station or a master UE and the like based on feedback received from the dRUE. In this case, the restricted range may correspond to a range configured/signaled by the base station or the master UE in consideration of the cellular UE or the different D2D pair or a range configured by a default value for a D2D operation. Meanwhile, the master UE or the base station can also manage a link of the dTUE and the dRUE. As mentioned in the foregoing description, since the dTUE, the dRUE, the master UE or the base station is able to manage a link in D2D, link management can be performed by a plurality of steps or can be performed in an aspect different from link management of legacy LTE/LTE-A. In the following, measurement according to embodiments of the present invention and link management are explained.

D2D Link Adaptation—Short Term Link Adaptation

D2D short term link adaptation can include a process that a dRUE measures a link from a dTUE and makes a feedback on CQI (channel quality information), MSC (modulation and coding scheme), an RI (rank indicator), a PMI (precoding matrix indicator) and the like based on SINR (signal-to-noise-plus-interference ratio). The D2D short term link adaptation can be comprehended as adaptation between UEs within a given resource (time/frequency resource (region), maximum transmit power, etc.) range. In particular, if a resource for a D2D operation and maximum transmit power are fixed, each D2D pair performs link adaptation via MCS and/or power control within the given resource and the maximum transmit power. For example, if a master UE/base station restricts maximum transmit power of a D2D link to 10 dBm, a D2D UE can transmit a D2D signal in a manner of controlling transmit power within 10 dBm range. And, if the master UE/base station assign 10 PRB pairs for D2D, the D2D UE can transmit a D2D signal using frequency selectivity within a range of the 10 PRB pairs. As a different example, a base station assigns a PRB pair set consisting of 3 contiguous PRB pairs to a plurality of D2D pairs and each of a plurality of the D2D pairs can perform a D2D operation using a PRB pair set preferred by a corresponding D2D pair. In this case, a region not to be used (or a region to be used) is fed back to the base station and it is able to make a resource not to be used by the corresponding D2D pair to be used for cellular or a different D2D operation. If link quality is not good enough although short term link adaptation is performed (e.g., a case of satisfying a trigger condition described in the following, etc.), the short term link adaptation can be repeatedly performed, DLF (D2D link failure) can be declared or long term link adaptation described in the following can be performed.

D2D Link Adaptation—Long Term Link Adaptation

Long term link adaptation may correspond to a request (e.g., (D2D) resource reallocation request) of a UE asking to allocate a new D2D resource different from a currently allocated D2D resource and/or allocation of a new D2D resource allocated by a master UE/base station (via (D2D) resource reallocation response, etc.). In particular, the D2D long term link adaptation can be comprehended as adaptation through readjustment of a previously allocated resource. In this case, a D2D resource may correspond a meaning including a (time/frequency) resource region capable of being used for transmitting a D2D signal or maximum transmit power applied to D2D signal transmission and the like. And, the long term link adaptation may apply to a situation (e.g., a case of satisfying a trigger condition described in the following) that a D2D pair is difficult to overcome with short term link adaptation.

When a new resource is allocated according to a request of a UE or determination of a master UE/base station, the new resource can be determined based on information (preferred PRB pair (set) index) reported by a dTUE and/or a dRUE. More specifically, the master UE/base station groups the total frequency bandwidth capable of being allocated with a constant interval (or random interval) (in a plurality of PRB pair (set) unit) and may be able to signal the information to each D2D pair in advance. A D2D pair can report a preferred PRB pair (set) index at the time of being indicated by the master UE/base station or predetermined time. Having received the report, the base station can allocate a new resource for a D2D operation based on the reported information. Or, the base station may permit additional transmit power to a D2D pair as much as a predetermined offset or based on an offset requested by the D2D pair.

If a link status is not good enough although the long term link adaptation is performed (e.g., a case of satisfying a trigger condition described in the following), the long term link adaptation can be repeatedly performed or DLF can be declared.

2-Step Link Adaptation

Link adaptation for a D2D operation can be performed using both the aforementioned short term link adaptation and the long term link adaptation. Each D2D pair performs the short term link adaptation within a predetermined resource or a resource allocated by a base station (or a master dUE). If link quality is still unstable in a condition (e.g., transmit power, coding rate) permitted to the short term link adaptation, each D2D pair can perform the long term link adaptation. If a new D2D resource and/or additional transmit power is allocated via the long term link adaptation, a D2D pair can perform the short term link adaptation within a corresponding condition. If link quality is still unstable although both the short term link adaptation and the long term link adaptation are performed, the D2D pair declares a D2D link failure and may be then able to terminate a D2D operation.

Trigger Condition

Trigger conditions described in the following can be used for the aforementioned short term link adaptation, the long term link adaptation or the 2-step link adaptation. In the trigger conditions described in the following, one of the trigger conditions can be independently used or two or more trigger conditions can be used together. When two or more trigger conditions are used together, 'satisfying trigger conditions' may indicate two or more trigger conditions are satisfied at the same time. For example, if SINR is smaller than a predetermined value and NACK is received more than a predetermined count, a trigger condition can be satisfied. In the following, triggering link adaptation may include performance of the short term link adaptation, performance of the long term link adaptation and declaring DLF.

A first triggering condition may correspond to SINR or BLER equal to or less than a predetermined value. More specifically, a dUE deducts SINR by measuring a D2D link. If the deducted SINR is equal to or less than a prescribed level, it may be able to trigger link adaptation. For example, if SINR incapable of satisfying BLER of a specific value is measured on a control channel or a data channel in a D2D operation, a dRUE may make a request for MCS of which a coding rate is low to a dTUE or may request D2D resource rearrangement or additional transmit power to a base station (or a master dUE).

A second triggering condition may correspond to NACK reception received more than a predetermined count. For example, a dTUE counts NACK transmitted by a dRUE. If the NACK becomes more than a predetermined value, it may be able to trigger link adaptation. Or, if the second trigger condition is satisfied, it may be able to restrict the short term link adaptation or the long term link adaptation to be performed only upon consideration of the reception of NACK.

A third trigger condition is to receive no signal from a D2D device during prescribe time. For example, if a dTUE does not receive ACK/NACK message from a dRUE for more than prescribed time from timing of receiving the ACK/NACK message, it may be able to trigger link adaptation. Or, when no signal is received from the dRUE in a subframe in which ACK/NACK or a specific signal is received, it may be able to count the number of the (contiguous) subframes. If the number is equal to or greater than a prescribed value, it may be able to trigger link adaptation.

If NACK is not received in response to transmission of a specific coding rate or no response is received, a fourth trigger condition is satisfied. In particular, if the fourth trigger condition is satisfied, it may be able to perform the long term link adaptation (of course, it may also be able to perform the short term link adaptation or declare DLF). And, the specific coding rate can be determined as a result of performing the short term link adaptation. For example, a dTUE performs link adaptation via MCS according to a request of a dTUE or NACK received from a dRUE. If NACK occurs after a signal is transmitted using MCS of a minimum coding rate, it may be able to perform the long term link adaptation.

Declaring DLF

If link quality is not good enough after short term link adaptation and/or long term link adaptation are performed, a D2D pair can declare a DLF. Having declared the DLF, a dTUE or a dRUE can terminate a D2D operation at the time of declaring the DLF. A D2D UE, which has not declared the DLF, can recognize the DLF declaration via link monitoring or signaling of a master UE/base station. More specifically, if a dUE, which has declared the DLF, terminates a D2D operation, a counterpart dUE performs link monitoring together with a trigger condition, declares the DLF at the time of satisfying a DLF condition and may be able to terminate a D2D operation. By doing so, additional signaling overhead is not required. Yet, if a dUE declaring a DLF corresponds to a dRUE, a dTUE can continuously perform D2D transmission. Hence, energy consumption and interference to a cellular UE (or a different D2D pair) may occur. In order to improve the aforementioned problem, a dUE, which has declared a DLF, can report information on whether the DLF is declared to a base station or a master UE. Having received the DLF declaration, the master UE/base station can signal the information to a corresponding D2D pair. A UE, which has received the signaling of the information on whether the DLF is declared, can terminate a D2D operation. The master UE/base station can signal a message (a confirm message for the DFL) for confirming termination of the D2D operation to the dUE, which has declared the DLF. In this case, the dUE, which has declared the DLF, can perform the D2D operation until the D2D termination confirmation message is received after the DLF is declared. If link quality is getting better more than a specific level during the period (e.g., if a signal is successfully transmitted and received more than a predetermined number during a time period from the time of declaring the DLF to the time of receiving the D2D terminal confirmation message or if NACK equal to or less than a predetermined number is received during the time period, etc.), the dUE can report a message for withdrawing the DLF to the master UE/base station.

If a trigger condition is satisfied again although short term link adaptation is performed (if NACK occurs although maximum transmit power and/or minimum coding rate are applied), a DLF can be declared. If a trigger condition is satisfied although long term link adaptation is performed, a DLF can also be declared.

Having received the DLF report, the master UE/base station can allocate a resource, which has been allocated to the D2D pair, to a different cellular UE or a different D2D pair (after checking termination of a D2D operation).

Figure 6:
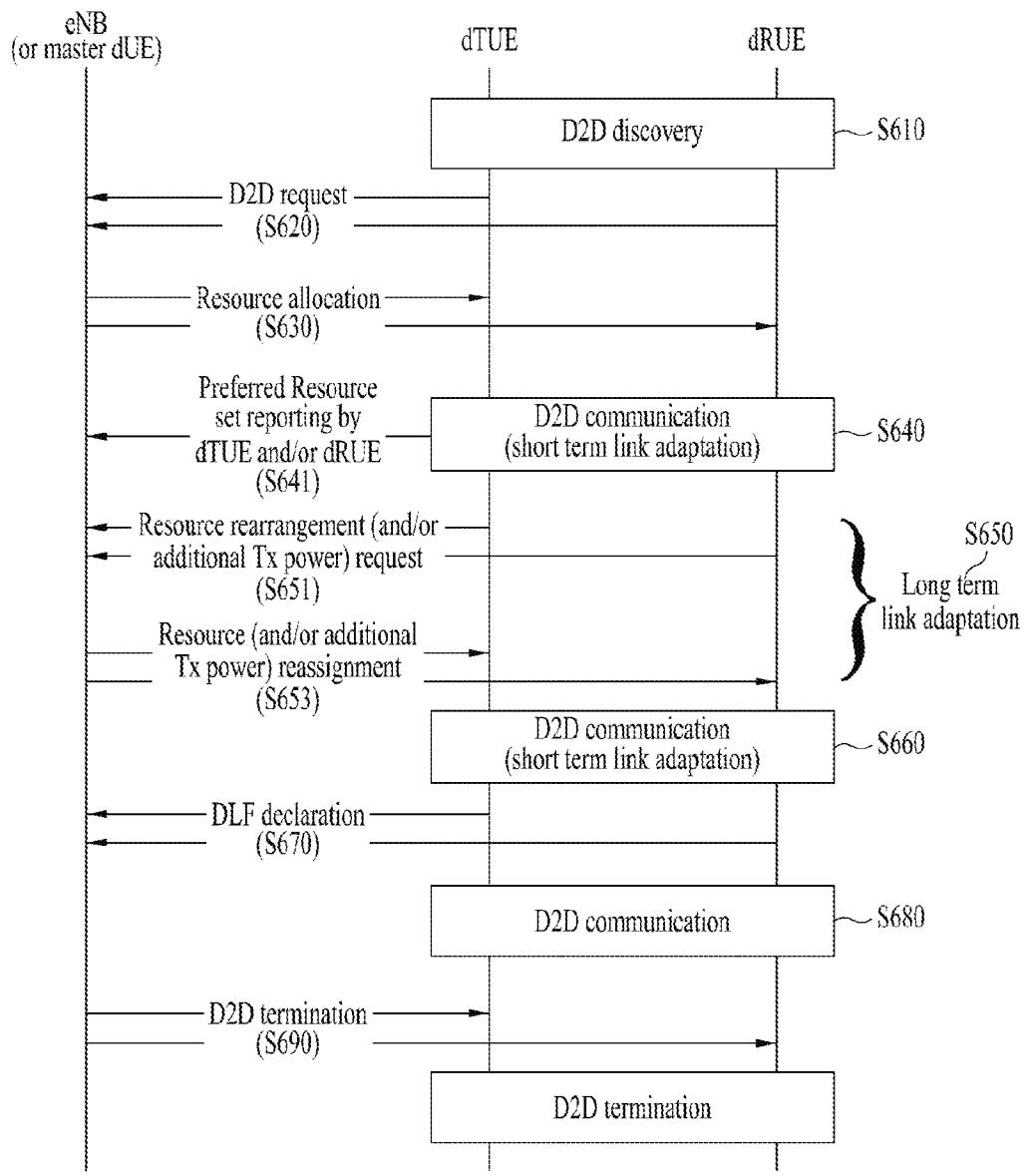
FIG. 6 is a flowchart for explaining measurement and link adaptation according to embodiments of the present invention.

In the following, detail examples of measurement and link procedures according to one embodiment of the present invention are explained with reference to FIG. 6. In FIG. 6, two arrows from (to) a network entity can be interpreted as a meaning of 'and/or'. For example, in the step S620, an eNB can receive a D2D request from a dTUE and/or a dRUE. And, it is not mandatory to sequentially perform all steps shown in FIG. 6. It may be able to perform a part of the steps only.

A D2D device (dTUE, dRUE) undergoes a discovery procedure [S610], transmits a D2D request [S620] and receives a response including D2D resource allocation and the like [S630] to perform D2D communication. Specifically, a dUE makes a request for D2D communication to a master UE/eNB, receives signaling of time/frequency resource to be used for performing discovery from the master UE/eNB and performs discovery using the resource. Having discovered a counterpart UE via the discovery procedure, a D2D pair can transmit a D2D request to the master UE/eNB. The D2D request can include information on an amount of resources necessary for the D2D communication. The master UE/eNB can allocate a resource capable of being used by the D2D pair for the D2D communication in response to the D2D request. And, the master UE/eNB can allocate not only the D2D resource but also a resource region for performing cellular communication with a D2D UE. The D2D pair can perform D2D communication on the allocated resource and may be able to perform cellular communication with the master UE/eNB in the resource region for performing the cellular communication.

When D2D communication is performed, a D2D UE can perform measurement and/or reporting on a D2D resource region [S610]. In this case, it is able to determine whether or not a result of the measurement satisfies the aforementioned trigger condition. If the trigger condition is satisfied, the D2D UE can perform short term link adaptation. The short term link adaptation can include a report on a preferred resource region selected from the measurement result [S641]. In this case, the preferred resource region may correspond to a resource region of which interference is lowest. Specifically, for example, the master UE/eNB divides total time/frequency resources, which are controlled for D2D usage, into a plurality of resource sets (e.g., 10 MHz is divided into 5 PRB pair units) and informs the D2D UE of a plurality of the resource sets. The D2D UE performs measurement according to a resource set, selects a preferred resource set and reports the preferred resource set. And, the short term link adaptation may perform power control, MCS adjustment, resource adjustment and the like.

If the trigger condition is satisfied again after the short term link adaptation is performed, a UE can perform long term link adaptation. As shown in FIG. 6, the long term link adaptation can be performed after the short term link adaptation is performed one time. Or, the long term link adaptation can be performed after the short term link adaptation is performed k times. In this case, a value of the k can be determined according to a distance between D2D devices, a size of a D2D resource, etc. As mentioned in the following description, when it is considered a D2D resource region is changed due to the performance of the long term link adaptation, if a first trigger condition is satisfied for a D2D resource region, the short term link adaptation (first link adaptation) is performed. If $n^{th}$ (In FIG. 6, n=2, if the short term link adaptation is performed k times, n=k+1) trigger condition is satisfied for the D2D resource region, the long term link adaptation can be performed.

The long term link adaptation can include reception of a resource reallocation response [S653] in response to transmission [S651] of a resource reallocation request and/or a resource reallocation request. An additional transmit power assignment request can be transmitted together with the resource reallocation request and additional transmit power assignment can be received together with a resource reallocation response. Or, the resource reallocation request can include the additional transmit power assignment request and the resource reallocation response can include the additional transit power assignment. A DLF command can be received instead of the resource reallocation response. Specifically, if a master UE/eNB is unable to allocate a new resource except a previously allocated D2D resource to a D2D pair or the master UE/eNB is unable to assign additional transmit power, the master UE/eNB may command a DLF. Having received the DLF, the D2D pair may terminate D2D communication or may be able to perform D2D communication via relay of the master UE/eNB or a different D2D UE.

Referring to FIG. 6, after the long term link adaptation is performed, if link quality is degraded, the D2D device can perform the short term link adaptation again [S660]. Or, unlike what is shown in the drawing, if a trigger condition is satisfied after the long term link adaptation is performed, DLF can be immediately declared.

If a triggering condition is satisfied after a second short term link adaptation is performed [S660], a D2D UE can declare a DLF. In order to prevent the DLF from being frequently occurred, a dUE may count over the number of performing the long term link adaptation. If the count satisfies a predetermined or signaled threshold, the dUE may declare DLF. If both a dRUE and a dTUE are able to transmit a long term link adaptation request, a dUE, which has requested the long term link adaptation, can inform a further different dUE of the D2D pair of a current count.

Although the DLF is declared, the D2D UE can perform D2D communication until a confirm message (a confirm message for the DLF) for the D2D termination is received from the master UE/eNB [S680]. As mentioned in the foregoing description, if link quality is enhanced in this section, declaration of the DLF can be nullified. The master UE/eNB can notify D2D termination via the confirm message for the D2D termination [S690]. In this case, a resource used by the D2D pair can be allocated to a cellular UE or a different D2D pair. Having received the D2D termination message, the D2D pair can terminate a D2D operation.

Configurations of Devices for Embodiments of the Present Invention

Figure 7:
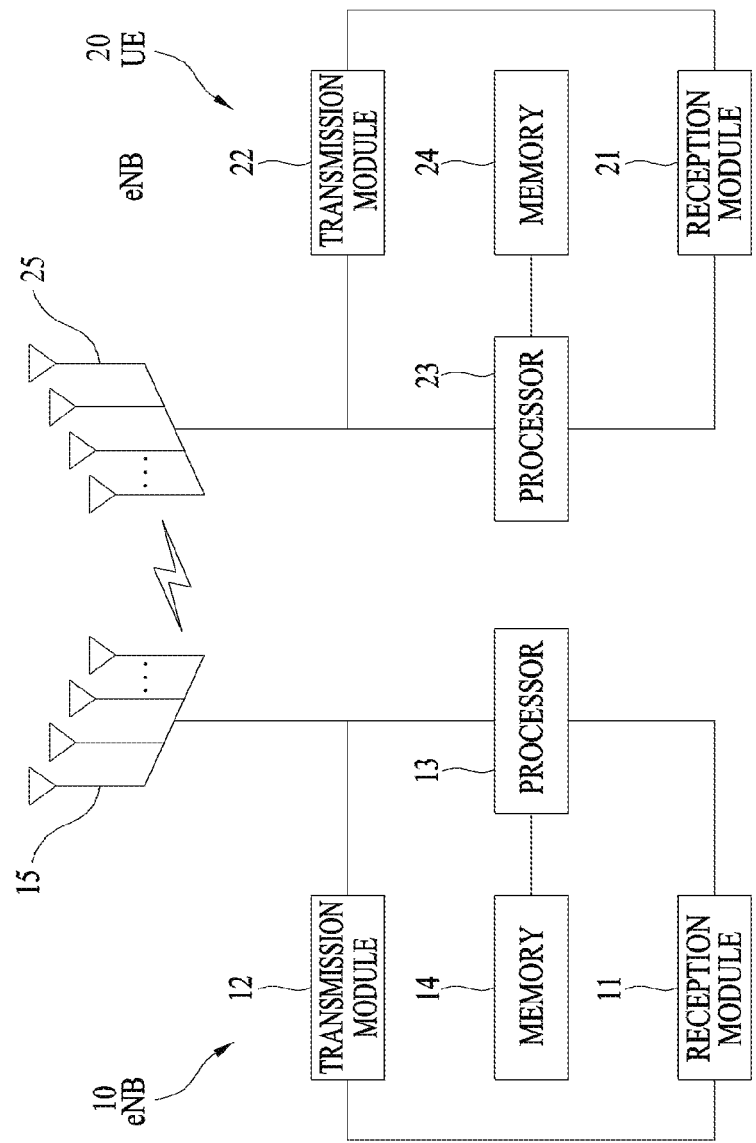
FIG. 7 is a diagram for a configuration of a transceiver.

FIG. 7 is a diagram illustrating configuration of a transmit point apparatus and a UE according to one embodiment of the present invention.

Referring to FIG. 7, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 7, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 7 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of performing link adaptation by a device-to-device (D2D) user equipment (UE) in a wireless communication system, the method comprising:
   performing measurement on a first resource region used for D2D communication;
   determining whether a result of the measurement satisfies a trigger condition, and
   performing different link adaptation according to a number of times the trigger condition is satisfied for the first resource region,
   wherein first link adaptation is performed if the trigger condition is satisfied one time, and
   wherein second link adaptation is performed if the trigger condition is satisfied at least two times.

2. The method of claim 1, wherein the first link adaptation comprises reporting a preferred resource region determined from the result of the measurement.

3. The method of claim 2, wherein the preferred resource region corresponds to a resource set having a smallest interference among a plurality of resource sets comprising a total resource region.

4. The method of claim 1, wherein the first link adaptation comprises at least power control, modulation and coding scheme (MCS) adjustment or resource adjustment.

5. The method of claim 1, wherein the second link adaptation comprises:
   transmitting a resource re-allocation request; and
   receiving a resource reallocation response or a D2D link failure (DLF) command in response to the resource re-allocation request.

6. The method of claim 5, wherein the resource re-allocation response comprises at least information indicating a second resource region different from the first resource region or additional transmit power assignment.

7. The method of claim 5, wherein the DLF command is transmitted when resource re-allocation or additional transmit power assignment is not available.

8. The method of claim 1, further comprising determining D2D link failure (DLF) if a number of times the second link adaptation is performed exceeds a predetermined number.

9. The method of claim 8, further comprising performing D2D communication after the DLF is determined until a confirm message for the DFL is received.

10. The method of claim 9, further comprising nullifying the DLF determination if a signal is successfully transmitted and received more than a predetermined number of times during a time period until the confirm message is received.

11. The method of claim 1, wherein the trigger condition corresponds to a signal-to-noise-plus-interference ratio (SINR) smaller than a predetermined value, receiving a NACK more than a predetermined number of times, not receiving a D2D signal for more than a predetermined number of times or receiving a NACK in response to transmission using a minimum coding rate.

12. A device-to-device (D2D) user equipment (UE) in a wireless communication system, the UE comprising:
   a receive module configured to receive signals; and
   a processor configured to:
   perform measurement on a resource region used for D2D communications;
   determine whether a result of the measurement satisfies a trigger condition, and
   perform different link adaptation according to a number of times the trigger condition is satisfied for the resource region,
   wherein first link adaptation is performed if the trigger condition is satisfied one time, and
   wherein second link adaptation is performed if the trigger condition is satisfied at least two times.

13. The UE of claim 12, wherein the first link adaptation comprises reporting a preferred resource region determined from the result of the measurement.

14. The method of claim 13, wherein the preferred resource region corresponds to a resource set having a smallest interference among a plurality of resource sets comprising a total resource region.

15. The UE of claim 12, wherein the first link adaptation comprises at least power control, modulation and coding scheme (MCS) adjustment or resource adjustment.

16. The UE of claim 12, wherein the second link adaptation comprises:
   transmitting a resource re-allocation request; and
   receiving a resource re-allocation response or a D2D link failure (DLF) command in response to the resource re-allocation request.

17. UE of claim 16, wherein the resource re-allocation response comprises at least information indicating a second resource region different from the first resource region or additional transmit power assignment.

18. The UE of claim 16, wherein the DLF command is transmitted when resource re-allocation or additional transmit power assignment is not available.

19. The UE of claim 12, further comprising determining D2D link failure (DLF) if a number of times the second link adaptation is performed exceeds a predetermined number.

20. The UE of claim 12, wherein the trigger condition corresponds to a signal-to-noise-plus-interference ratio (SINR) smaller than a predetermined value, receiving a NACK more than a predetermined number of times, not receiving a D2D signal for more than a predetermined number of times or receiving a NACK in response to transmission using a minimum coding rate.

* * * * *